United States Patent [19]

Kuntner et al.

[11] 4,288,828
[45] Sep. 8, 1981

[54] PROTECTION SYSTEM FOR ELECTRIC MOTORS

[75] Inventors: Richard J. Kuntner, Milwaukee; James C. Vander Meer, Brookfield, both of Wis.

[73] Assignee: Eaton Corporation, Cleveland, Ohio

[21] Appl. No.: 113,008

[22] Filed: Jan. 17, 1980

[51] Int. Cl.³ .................. H02H 7/08; H02H 7/093
[52] U.S. Cl. ........................... 361/31; 361/23; 318/395; 318/430; 318/454
[58] Field of Search ............... 361/31, 23, 28, 29, 361/22, 94; 318/306, 308, 309, 311, 330, 387, 391, 394, 395, 400, 430, 453, 454, 455, 476, 477, 484

[56] References Cited

U.S. PATENT DOCUMENTS

| | | | |
|---|---|---|---|
| 3,009,067 | 11/1961 | Janeczko et al. | 318/484 X |
| 3,633,073 | 1/1972 | Day et al. | 361/22 |
| 3,912,976 | 10/1975 | Sons et al. | 361/31 |
| 3,959,704 | 5/1976 | McCrea | 361/31 X |
| 4,000,446 | 12/1976 | Vandevier et al. | 361/31 |

Primary Examiner—Harold Broome
Assistant Examiner—Reinhard J. Eisenzopf
Attorney, Agent, or Firm—R. J. McCloskey; H. R. Rather

[57] ABSTRACT

A solid state protection system for AC electric motors driving high inertia loads requiring long acceleration times. An electroresponsive relay (OL) is separately responsive to permissible acceleration time, circuitry (DT, DC), acceleration overload current circuitry (ACA), and to normal running overload current circuitry (ACR). Up-to-speed detector and latch circuits (USD, USL) deactivate the acceleration time circuitry and overload current circuitry, and activate the running overload current circuitry upon attainment of normal running speed by the motor. The response levels of the overload and time response circuits are individually settable.

14 Claims, 6 Drawing Figures

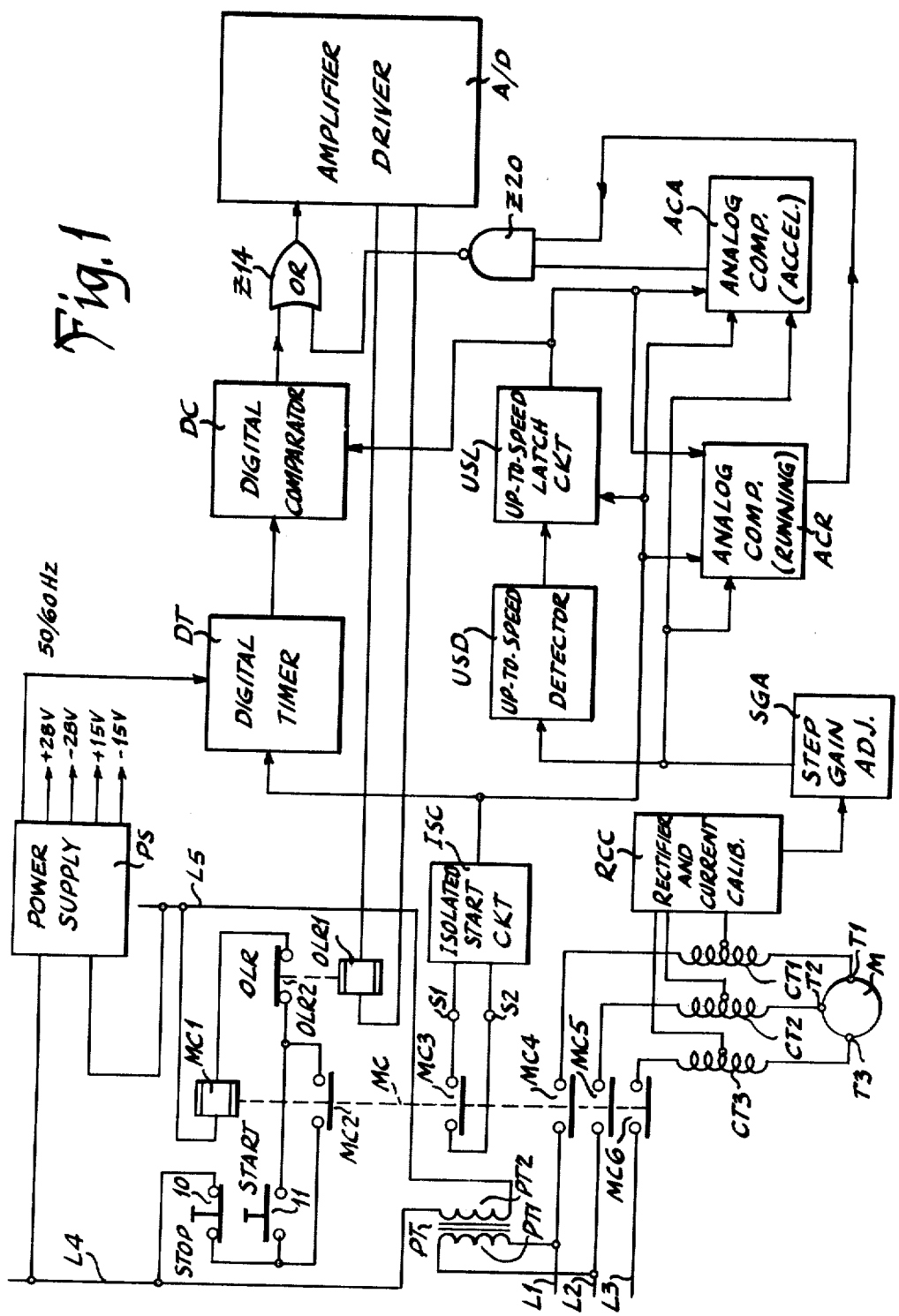

| 5/2 FIG.2a | 5/3 FIG.2b |
| --- | --- |
| 5/4 FIG.2c | 5/5 FIG.2d |

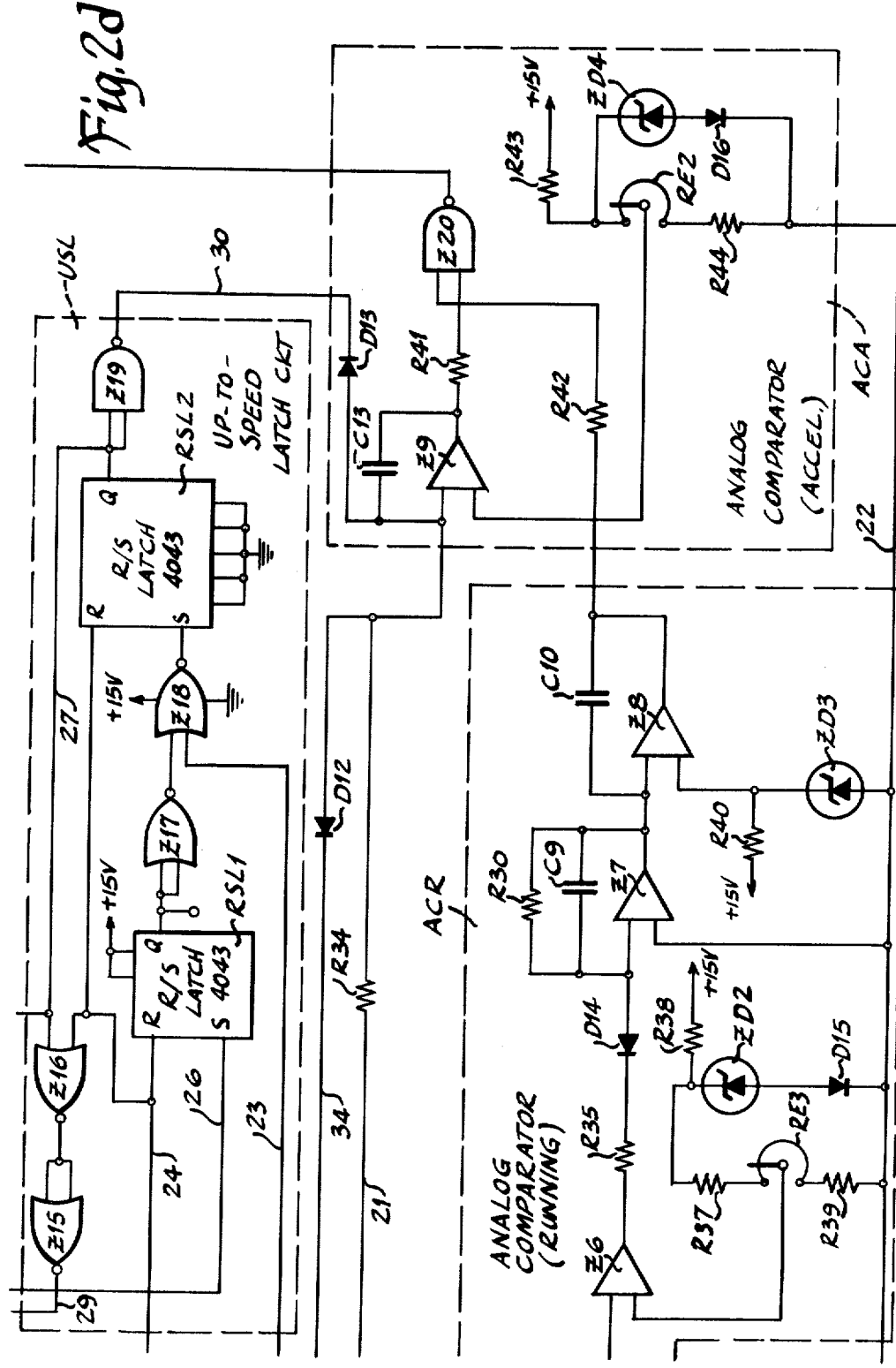

PROTECTION SYSTEM FOR ELECTRIC MOTORS

The present invention relates to a protection system for electric motors which drive high inertia loads that require relatively long acceleration times.

BACKGROUND OF THE INVENTION

The commonly used thermal or magnetically responsive overload relays with electric motors are not satisfactory when used with such motors driving high inertia loads that require long periods of time to accelerate to normal running speed. Such relays are usually given compromise settings for overload current response which can result in unwanted nuisance tripping. It is therefore desirable to have an overload protection system for such motors that will permit establishment and response to different preset overload current levels during acceleration and normal running, and also provide motor deenergization in the event the motor exceeds a preset time limit in reaching normal running speed.

SUMMARY OF THE INVENTION

It is the primary object of the present invention to provide an improved overload protection system for electric motors particularly suitable for AC motors when driving high inertia loads that require relatively long acceleration times to normal running speed.

A further object of the invention is to provide a protection system of the aforementioned type which permits separate current overload response settings that are effective during the acceleration and normal running periods respectively, and additional separate presetting of the maximum allowable time for the motor acceleration period.

A still further object is to provide in such a protection system in which the normal running overload response portion of the system is held inactive until normal running speed is attained, and the acceleration overload and allowable time response portions are rendered inactive upon attainment of normal running speed, Another further object is to provide a protection system wherein the individual response levels to overloads and permissable motor acceleration time are individually adjustable.

Other objects and advantages of the invention will hereinafter appear.

DESCRIPTION OF THE DRAWINGS

FIG. 1 is a combination schematic and block diagram of the preferred embodiment of the invention as used in connection with the control circuit of a polyphase A.C. motor.

FIGS. 2a to 2d together is an electrical schematic diagram which more completely illustrates the embodiment of FIG. 1, and FIG. 3 indicates how the individual FIGS. 2a to 2d sheets should be arranged to provide a complete schematic representation of the embodiment of FIG. 1.

DESCRIPTION OF THE PREFERRED EMBODIMENT

Figures 2A, 3:
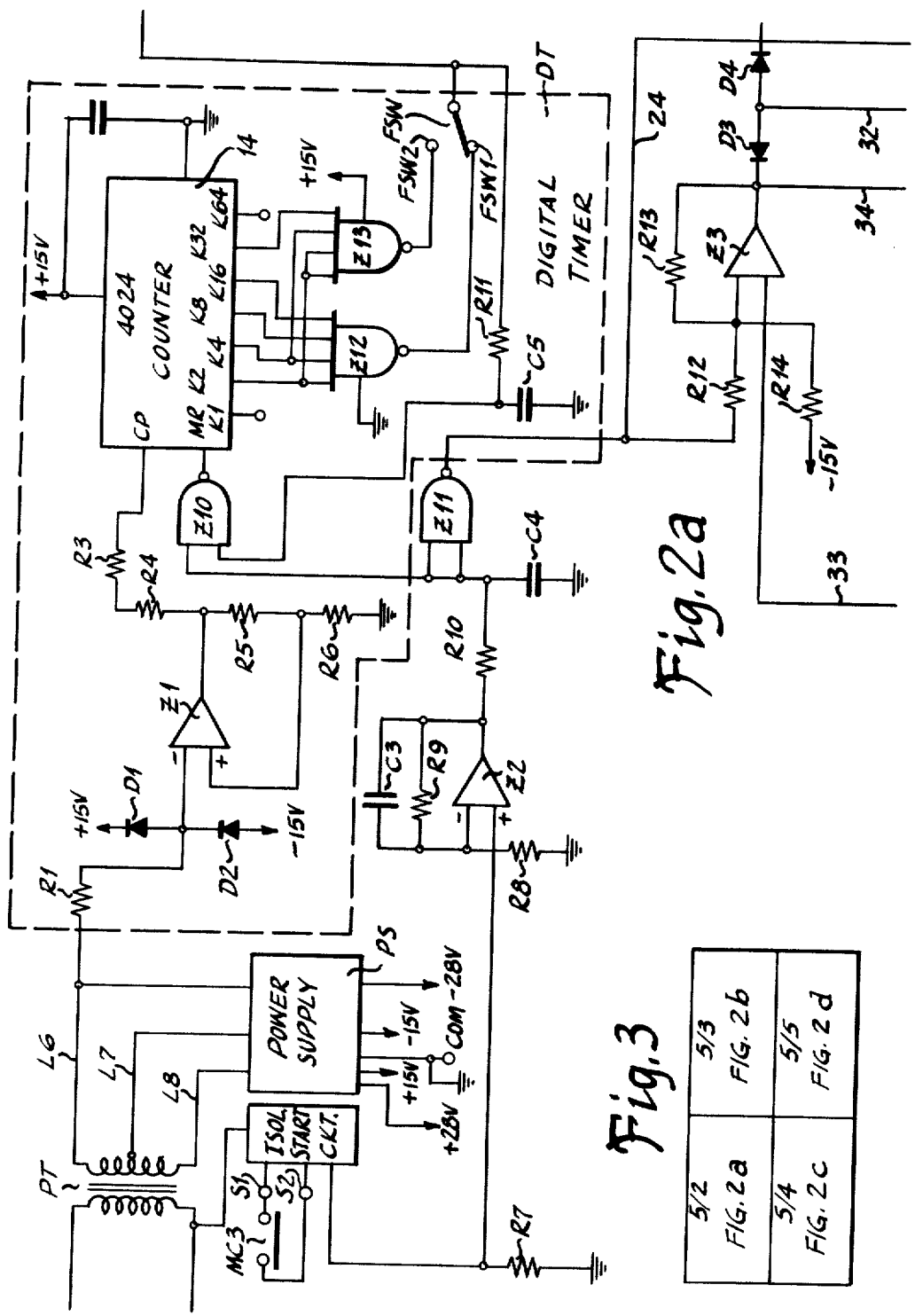

Referring to the showing in FIG. 1, it shows a polyphase A.C. power supply having supply conductors L1, L2, and L3 which are connectable respectively to the primary terminals T1, T2 and T3 of a three phase motor M upon closure of contacts MC4, MC5 and MC6 of an electroresponsive contactor MC. A.C. control lines L4 and L5 are supplied from the secondary winding PT2 of a step-down transformer PT which has its primry winding PT1 connected across the supply lines L1 and L2. The operating coil MC1 of contactor MC is connected at one end to A.C. line L5 and at its other end in series with the normally closed contacts OLR2 of an electroresponsive relay OLR, normally open contacts of a "start" switch 11, and the normally closed contacts of a "stop" switch 10. Contactor MC also has an auxiliary set of normally open circuit maintaining contacts MC2 connected in shunt across the start switch, and a second set of normally open contacts MC3 which when closed initiates operation of the solid state overload responsive circuitry as will hereinafter be explained.

Assuming that AC control lines L1, L2 and L3 are energized, the AC control lines L4 and L5 will also be energized. Then if start switch 11 is closed, coil MC1 will be energized to close its contact sets MC2 through MC6. Consequently, motor M will then be connected to lines L1, L2 and L3 and under normal conditions will accelerate to its rated running speed. Upon release of switch 11, the then closed contacts MC2 will maintain coil MC1 of contactor energized until the stop switch 10 is opened.

Closure of contacts MC3 causes an isolated start circuit designated ISC to become operative to render the solid state circuitry operative. An output signal from circuit ISC renders a digital timer DT active after a momentary time delay, and also readies an up-to-speed latch circuit USL, an analog comparator (running) ACR, and an analog comparator (acceleration) ACA for operation. The Digital Timer DT in conjunction with the digital comparator DC, as will hereinafter be explained in detail, has provision for selecting any desired time interval from 1 to 63 seconds as the maximum allowable time of acceleration of motor M to its rated speed. If the preselected time has elapsed and motor M has not reached its rated speed digital timer DT acts in conjunction with a digital comparator DC to provide a "High" output signal to a digital OR circuit designated Z14 which then supplies a high output signal to an amplifier/driver circuit AD which then causes energization of the electroresponsive operating coil OLR1 of relay OLR. Relay OLR thereupon opens its contacts OLR2 to interrupt the energizing circuit for coil MC1 of contactor MC to thereby cause deenergization of the motor M.

When motor M is initially energized through closure of contacts MC4 to MC6 of contactor MC, three motor current sensing transformers CT1, CT2 and CT3 in current sensing relation to the lines L1 to L3, respectively, is active to supply three phase currents to a rectifier and current calibrating circuit RCC. Circuit RCC then provides an unidirectional output signal to a step gain adjust circuit SGA that in turn provides an amplified DC output signal to an up-to-speed detector circuit USD, analog comparator circuit ACA, and to analog comparator circuit ACR.

If, during the acceleration period of motor M to its rated speed, an overload current, exceeding a presettable magnitude in the range of 150% to 1000% of rated running current, is sensed by current transformer CT1, CT2 and CT3 the latter acting through circuits RCC and SGA supplies a DC signal to analog comparator circuit ACA of such magnitude that the latter in turn supplies a "low" DC output signal which is the input signal to a NAND circuit Z20. Circuit Z20 then shifts its normal "0" output signal to "high" which is connected to an input of OR circuit Z14. The output of OR circuit which was previously "low" then shifts to "high" to activate amplifier/driver circuit AD which as aforeindicated results in deenergization of motor M.

Now assume that motor M has reached its rated speed within the preselected time limit dictated by the settings of timer DT and comparator DC. Upon attainment of rated speed the up-to-speed detector circuit USD responds to activate the up-to-speed latch circuit USL which then provides a "high" DC output which deactivates comparator circuit ACA, Timer Circuit DT, and Digital Comparator DC and activates comparator circuit ACR. If, at any time during the normal running operation of motor M, the current transformers CT1, CT2 and CT3 sense motor running current in excess of another preselected magnitude, such as, for example, 107% of rated current, circuit ACR then functions to provide a "low" DC output signal to the NAND circuit Z20, which then in conjunction with OR circuit Z14, amplifier/driver AD, and overload relay OLR acts to deenergize motor M in the manner aforedescribed.

When main contactor MC drops out, as a result of energization of relay OLR, the opening of its contacts MC3 deactivates the isolated start circuit ISC which in turn causes reset of the digital timer DT, digital comparator DC, up-to-speed detector USD and latch circuit USL. The analog comparator circuits ACA and ACR are likewise reset as are NAND circuit Z20, OR circuit Z14 and the amplifier/driver circuit AD. Accordingly, the solid state circuitry will then be ready to be active in the proper sequential modes upon reclosure of contacts MC3 when motor M is again energized.

A detailed description of the various elements and functions of the solid state portions of the circuitry will now be made in connection with FIGS. 2a to 2d.

POWER SUPPLY AND ISOLATED START CIRCUIT

These are shown in FIG. 2a. AC power input to the DC power supply circuit PS is afforded through lines L6, L7 and L8 the tapped secondary winding PT2 of stepdown transformer PT. The circuitry of PS may be assumed to be conventional circuits affording regulated +15 and −15 volt DC supplies, and unregulated +28 volt and −28 volt DC supplies as shown.

The input terminals S1 and S2 of isolated start circuit ISC are connected through contacts MC3 to the non inverting input terminal of an operational amplifier Z2 which has it output terminal connected in series with a resistor R10 to the timed input terminal of a NAND logic module Z11, one input terminal of another NAND module Z10, and in series with a capacitor C4 to ground. The output terminal of Z2 is also connected through a parallel combination of a resistor R9, and a capacitor C3 to its inverting input, and then in series with a resistor R8 to ground. Z2 acts as a voltage follower with time delay as dictated by the RC time constant of R9 and C3. When contacts MC3 are closed, the DC output of Z2 goes from 0 to a "high" level and that causes the outputs of both Z10 and Z11 to switch from "high" to "low" levels.

DIGITAL TIMERS AND COMPARATORS

Figure 2B:
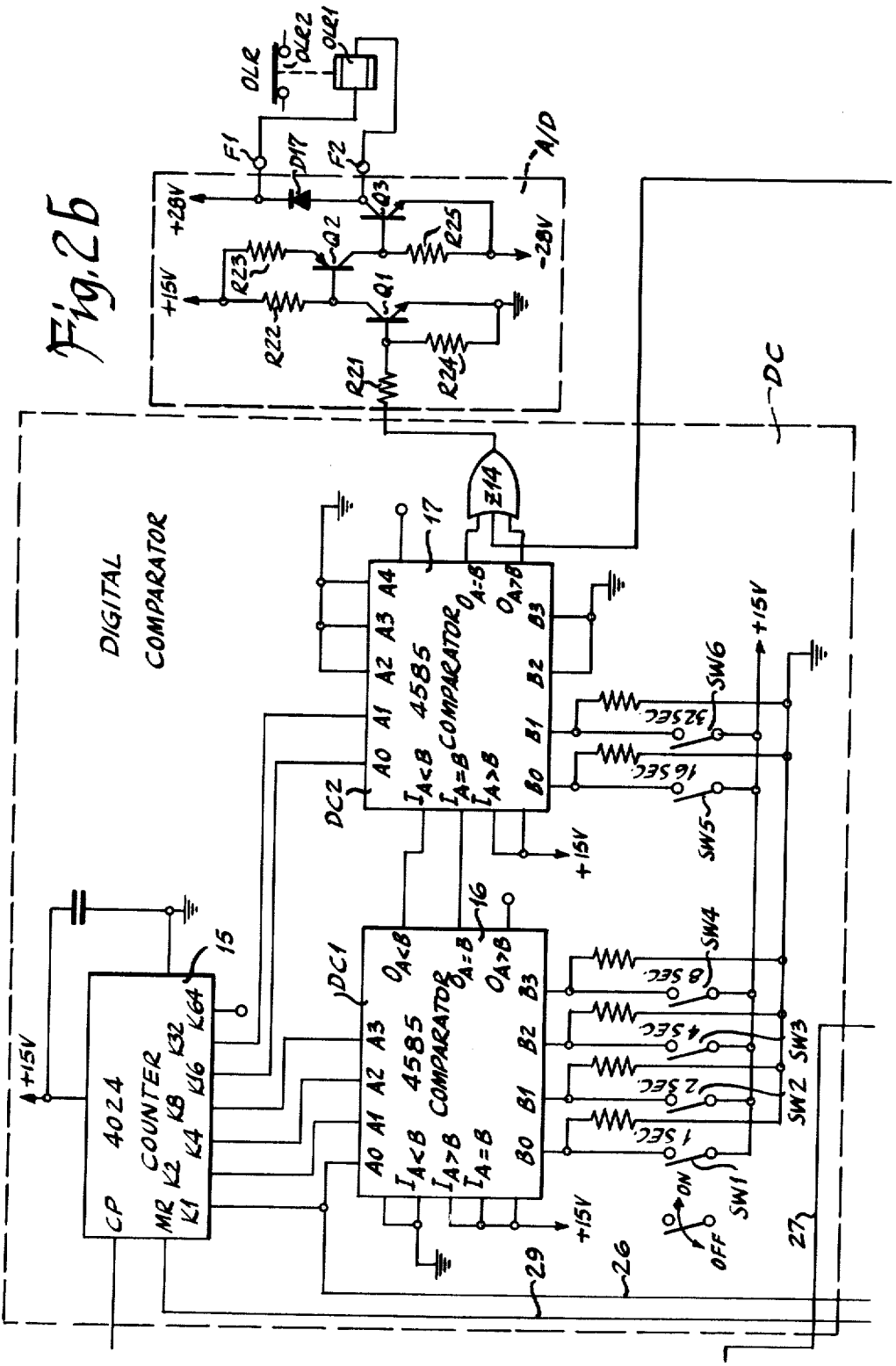

These are shown in detail in FIGS. 2a and 2b. Line 6 from secondary winding PT2 of step-down transformer PT is connected in series with a resistor R1 to the inverting input terminal of an operatonal amplifier Z1 which has its output terminal connected in series with resistors R3 and R4 to the count input terminal CP of the digital counter 14, and through the series resistors R5 and R6 to ground. The positive and negative DC voltage supply terminals of Z1 are connected to +15 and −15 volts DC voltage sources, respectively. The non inverting input terminal of Z1 is connected to the point common between resistors R5 and R6. The point common between resistor R1 and the inverting input terminal Z1 is connected through a diode D1 to limit a source of a positive half wave rectified DC voltage to +15 volts, and through a reversely poled diode D2 to limit to a similar −15 volt DC source.

As the inverting input terminal is supplied with AC at supply frequencies of either 50 or 60 Hz, it will generate a square wave output signal of the same frequency.

The counter 14 in addition to its reset and count pulse input terminals MR and CP has seven count output terminals designated K1, K2, K4, K8, K16, K32 and K64, respectively. The binary count output terminal K2, K4, K8 and K16 are connected to the inputs of a four input NAND module Z12, and count output terminal K2, K4 and K32 are connected to the four input terminals of another NAND module Z13 like Z12. The output terminals of Z12 and Z13 are selectively connected by a two position switch FSW to the count input terminal CP of another seven stage digital counter 15 of digital comparator DC. The reset count pulse input terminals and binary count output terminals bear the same reference numerals as counter 14. The count output terminals K1, K2, K4 and K8 are connected to the count input terminal A0 to A3 of a type "4585" digital comparator 16 and the terminals K16 and K32 are connected to the count input terminals A0 and A1 of another comparator 17 like the comparator 16.

The $I_{A<B}$ input terminal of comparator 16 is connected to ground and the $I_{A>B}$ and $I_{A=B}$ input terminal are connected to +15 volts DC. The comparing input terminals B0 to B3 of comparator 16, and the similar terminal B0 and B1 of comparator 17 are each connected through 10 Kohm resistors to ground and each there of are connectable respectively through single pole switches SW1 to SW6 to +15 volts DC. The terminal A2 and A3 and B2 and B3 of comparator 17 are connected to ground. The output terminals $O_{A<B}$ and $O_{A=B}$ of comparator 16 are connected in cascade to the input terminals $I_{A<B}$ and $I_{A=B}$ of comparator 17. The output terminals $O_{A>B}$ and $O_{A=B}$ are connected to the input terminals of the digital OR module Z14.

Let it be assumed that the switch FSW is closed to contact FSW1 to connect the output of NAND module Z12 to the count input terminal CP of counter 15. With 60 Hz square wave pulses being fed into counter 14, one pulse per second will be fed into the terminal CP of counter 15, and it will register such pulses and provide count output signals at its terminal K1 to K32 in a well known binary count mode. Now let it be assumed that the permissable time within which motor M must accelerate to its rated running speed is to be set at 7 seconds. Switches SW1, SW2 and SW3 would then be closed corresponding to 1, 2 and 4 seconds, repectively, which when added total 7 seconds. When "high" level output signals appear at input terminals A0, A1, and A2, they will match with "high" levels appearing at terminals B0, B1 and B2, and an output signal will be fed from the $O_{A=B}$ output terminal of comparator 16 into the $I_{A=B}$ input terminal of comparator 17. Because of the cascade connection of the latter comparator the 7 second output signal generated in comparator 16 feeds through to the $O_{A \cdot B}$ output terminal of comparator 17 and to the upper input terminal of OR module Z14.

The permissible maximum time for acceleration of motor M can be preset as desired at one second intervals between 1 and 63 seconds by appropriate closure of the binary comparator count switch SW1 and SW6 in the binary 1, 2, 4, 8, 16 and 32 mode. The connection of terminal $O_{A>B}$ of comparator 17 to the lower input terminal of OR module Z14 insures that there will be following "high" level output pulses to insure the activation of the amplifier/driver AD.

If the AC power supply has a 50 Hz frequency, then switch FSW should be closed to its contact FSW2, and then the output of NAND module Z13 will be connected to the count input terminal CP. It will be understood that the digital timer and comparator circuits will function exactly the same as aforedescribed.

AMPLIFIER-DRIVER

The output terminal of OR module Z14 is connected through resistor R21 in series with the base of an NPN transistor Q1 which has its emitter connected directly to ground, and its collector connected in series with a resistor R22 to +15 volts DC a resistor R24 is connected between the base and emitter of Q1. The point common between the collector of Q1 and resistor R22 is connected to the base of a PNP transistor Q2. The emitter of Q2 is connected in series with a resistor R23 to +15 volts DC and its collector is connected in series with a resistor R25 to −28 volts DC. The point common between resistor R25 and the collector of Q2 is connected to the base of an NPN transistor Q3. The emitter of Q3 is connected directly to −28 volts DC and its collector is connected through a D17 to +28 volts DC. The terminal F1 of overload relay coil OLR1 is connected to the point common between the cathode of D17 and +28 volts and the F2 of the relay is connected to the point common between the collector of Q3 and the anode of cathode D17.

With a "low" level DC signal impressed on the base of Q1 from the output of OR module Z14, Q1 will be non conducting. As a consequence the base of Q2 will be near the +15 volt DC level rendering the latter transistor non conducting. Thus, the base of transistor Q3 will be slightly above −28 volts DC, thereby holding Q3 non conducting. The terminals at coil OLR1 of overload relay will be at +28 volts and slightly less than that respectively. Coil OLR1 with a "low" level DC signal on the base of transistor Q1 will not be energized to open its contacts OLR2.

Now when Z14 shifts to a "high" level DC output, Q1 and Q2 successively are rendered conducting to provide an amplified high level signal on the base of transistor Q3 that renders the latter conducting. DC energizing current then flows from +28 volt through terminal F1, coil OLR2, terminal F2, and the collector-emitter circuit of transistor Q3 to −28 volts. Coil OLR1 is therefor energized to open its contacts OLR2 which is aforedescribed causes motor M to be deenergized. Upon deenergization of coil OLR1, diode D17 provides for a local energy disipation path for that coil.

MOTOR CURRENT SENSING, RECTIFYING AND STEP GAIN ADJUST CIRCUITS

Figure 2C:
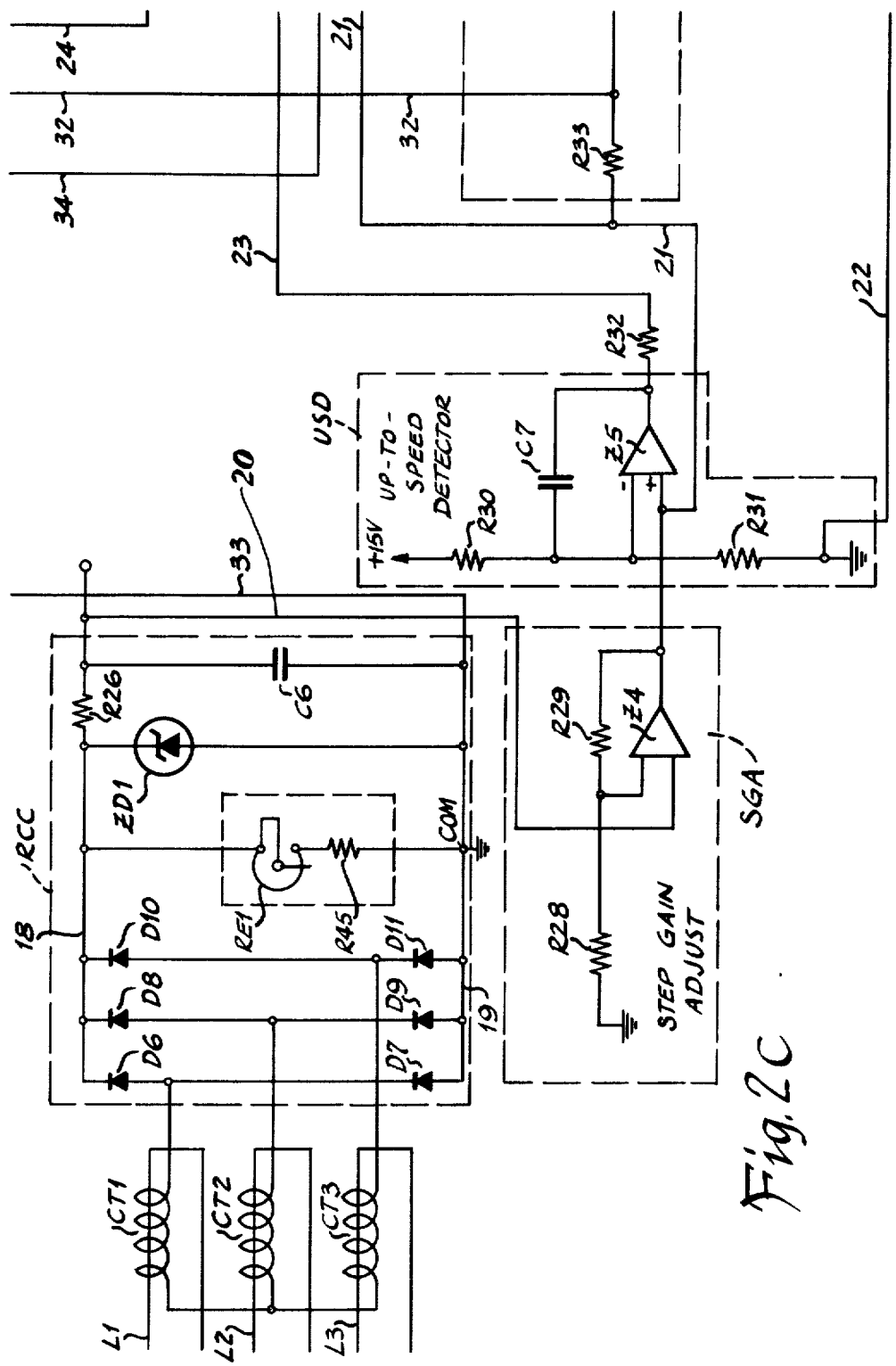

These are shown in detail in FIG. 2c. The three phase current transformers CT1, CT2 and CT3 are arranged in inductive current sensing relationship to the supply lines L1, L2 and L3 and may assume to be located between the contacts MC4 to MC6 of contactor MC and the primary terminal T1 to T3 of motor M. These current transformer secondaries are connected together in star at their corresponding left hand ends, and are connected at their right hand ends to the junctions between the diode pairs D6-D7, D8-D9 and D10-D11 of a three phase rectifier bridge in the rectified current calibration circuit RCC.

The diodes D6, D8 and D10 have their cathodes connected to a positive potential bus 18 and their anodes to the cathodes of the diodes D7, D9 and D11 respectively. The anodes of the latter diodes are connected to a conductor 19 which is connected to ground. A potentiometer rheostat RE1 has its resistance element connected in series with a resistor R45 across the conductors 18 and 19. Conductor 18 has a resistor R26 connected therein and the cathode of a zener voltage regulating diode ZD1 is connected to conductor 18 at the left hand end of resistor R26. A capacitor C6 is connected at its high potential terminal to conductor 18 adjacent the right hand end of resistor R26. The anode of ZD1 and the low potential terminal of C6 are commonly connected to the conductor 19.

The zener diode ZD1, resistor 26 and capacitor C6 provide transient protection of the rectified current which will be proportional to the motor current at any instant. Potentiometer RE1 through adjustment of its slider permits calibration of the rectified DC current to a desired value when the motor current is 100% of the rated value. A conductor 20 connected to the point common between resistor R26 and the high potential terminal of capacitor C6 provides a DC signal connection to the non inverting input terminal of the operational amplifier Z4 in the step gain adjust circuit SGA.

The inverting input terminal of amplifier Z4 is connected to the point common between the right hand end of resistor 28 and the left hand end of a resistor 29. The left hand end of resistor 28 is connected to ground and the right hand end of resistor 29 is connected to the output terminal of amplifier Z4. Amplifier Z4 acts as a voltage follower DC amplifier providing an amplified DC output signal which proportionately follows the DC input signal applied to its non inverting input terminal.

UP-TO-SPEED DETECTOR

This circuit is shown in detail in FIG. 2c and comprises an operational amplifier Z5 which has its non inverting input terminal connected to the output terminal of amplifier Z4 in the step gain adjust circuit SGA. The inverting input terminal is connected to the point common between resistors R30 and R31 and one terminal of a capacitor C7 which is connected at its other terminal to the output terminal of Z5. The upper end of resistor R30 is connected to the +15 volt DC supply and the lower end of resistor 31 is connected to ground.

The amplifier Z5 with its connections just described acts as a comparator switch. It provides a "low" (negative) level output until the DC potential applied on its non inverting input terminal exceeds the reference voltage established at its inverting input terminal by the voltage dividing resistors R30-R31. During the initial motor acceleration from start, the output of Z5 will go from "low" to a "high" level DC output. As will hereinafter be explained, this shift in output from a "low" to "high" level of Z5 during the acceleration period of the motor has no effect. However, as the motor approaches running speed, the current drawn by motor M decreases and when it again reaches the preset value, amplifier Z5 switches back from a "high" to a "low" level output, which as will be hereinafter explained, renders the running analog comparator (running) ACR active and the acceleration analog comparator (acceleration) ACA inactive.

ANALOG COMPARATOR (ACCELERATION)

The comparator circuit ACA is shown in detail in FIG. 2d. It comprises an operational amplifier Z9 which has its inverting input terminal connected in series with a resistor R34 and a conductor 21 to the output terminal of amplifier Z4 in the step gain adjust circuit. The non inverting input terminal of Z9 is connected to the adjustable slider of a potentiometer rheostat RE2 that has one end of its resistance element connected in series with a resistor R43 to +15 volts DC and its other end connected in series with a resistor R44 and through a conductor 22 to ground. A zener diode ZD4 and a series connected opposing diode D16 are connected in parallel with the resistance element of potentiometer rheostat RE2 and resistor R44. Adjustment of the slider of rheostat RE2 permits adjustment of the level of DC reference voltage to which the non inverting input terminal is subjected.

A capacitor C13 is connected between the output terminal of Z9 and its inverting input terminal. The output terminal of Z9 is connected in series with a resistor R41 to an input terminal of a digital NAND module Z20. Immediately after start of motor M the DC potentials on the inverting and non inverting input terminal of Z9 will be low and high respectively, consequently the output of Z9 will be at a "high" level. It may be assumed that the other input terminal to NAND module Z20 will also be at a "high" level thereby providing a "low" level at the output of Z20.

Now as motor M accelerates, the amplified output from amplifier Z4 in the step gain adjust circuit will increase, thereby affording, by virtue of its connection through conductor 21 and resistor R34 with the inverting input terminal of amplifier Z9, an increase in DC potential to which the latter terminal is subjected. If due to an overload that DC potential rises above the reference potential to which the non inverting input terminal of Z9 is subjected, the output of Z9 shifts from a "high" to a "low" level. This in turn causes the output of module Z20 to shift from a "low" to "high" level, and as aforedescribed, the output of OR module Z14 then shifts from a "low" to "high" level to activate the amplifier/driver circuit AD to energize the coil OLR1 of relay OLR.

UP-TO-SPEED LATCH CIRCUIT

This circuit, shown in detail in FIG. 2d, comprises two type "4043" R/S digital latch modules RSL1 and RSL2, and four digital NOR modules Z15 to Z18 and a digital NAND module Z19. The output of amplifier Z5 in the up-to-speed detector circuit USD is connected through resistor R32 and conductor 23 to one input terminal of a NOR module Z18 which has its other input terminal connected to the output terminal of NOR module Z17. The output terminal of module Z18 is connected to the "set" input terminal S of latch RSL2, and the two input terminals of NOR module Z17 are connected together to the "Q" output terminal of the latch RSL1.

The "reset" input terminal of latches RSL1 and RSL2 and one input terminal of NOR module Z16 are connected by the conductor 24 to the output terminal of NAND module Z11 in the isolated start circuit ISC. The "set" input terminal of latch RSL1 is connected through a conductor 26 to the binary K1 output terminal of the counter 15 in the digital comparator DC. The "Q" output terminal of latch RSL2 is connected to both input terminals of the digital NAND module Z19, through a conductor 27 to the upper input terminal of Z16 and additionally through a conductor 27 and the reversely poled diodes D3 and D4 to the output terminal of an operational amplifier Z3. The output terminal of NAND module Z19 is connected to the cathode of a diode D13 which is connected at its anode to the point common between the inverting input terminal of amplifier Z9 and resistor R34 in conductor 21.

The output terminal of NOR module Z16 is connected to both input terminals of NOR module Z15 which has its output connected through a conductor 29 to the "reset" input terminal of the counter 15.

It will be observed that at the moment the contacts MC3 of the isolated start circuit are re-opened the output of NAND module Z11 will shift from a "low" to a "high" level, thereby causing latches RSL1 and RSL2 to reset, and the "Q" output terminal of these latches to go from a "high" to a "low" output levels. Consequently, the input terminals of module Z17 will be at a "low" level and its output terminal will be at a "high" level, thereby causing the upper output terminal of NOR module Z17 to be at a "high" level. Now as comparator switch module Z5 will be at "low" level at its output terminal, the lower input terminal of module Z18 will be at a "low" level. Consequently, the output level of Z18 and the input level to "set" terminal of latch RSL2 will be at a "low" level. Thus the "Q" output terminal of RSL2 will be at a "low" level and the output of NAND module Z19 will accordingly be at a "high" level.

When the output of NAND module Z11 shifts from a "high" to a "low" level as a result of closure of contacts MC3, as aforedescribed, the level on the "reset" input terminal to the latches RSL1 and RSL2 correspondingly shift from a "high" to "low" thereby readying these latches for further action. A one second time delay is generated as a result of the first count input pulse being impressed on input terminal CP of counter 15. This positive pulse appears at output terminal K1 of the latter which through conductor 29 is impressed on the "set" input terminal of latch RSL1. This causes the level of the "Q" output terminal of the latter to shift from a "low" to a "high" level. Module Z17 inverts this so that the output of the latter shifts from a "high" to a "low" level which correspondingly places the upper input terminal of NOR module Z18 at a "low" level.

As the motor M accelerates during the aforementioned one second time delay, the output of amplifier Z5 shifts from a "low" to "high" level, to provide a corresponding "high" level shift at the lower input terminal of NOR module Z18. Consequently, the output of Z18 stays at the "low" level until the motor starting current subsides to the point that causes the output of amplifier Z5 to shift from a "high" back to a "low" level. When that occurs both input terminals of Z18 will be at a "low" level causing its output and the "set" input terminal of latch RSL2 to shift to a "high" level. The "Q" output terminal of the latter latch then shifts to a "high" level causing the output of NAND module Z19 to go to the "low" level. When the output of Z19 goes to the "low" level current previously flowing into the inverting input terminal of amplifier Z9 through conductor 21 and resistor R34 from the output of amplifier Z4 is diverted through the diode D13 and a conductor 30 to the "low" level output terminal of Z19.

The output of amplifier Z9 as a result is held at a "high" level state and is thereafter prevented, until the contacts MC3 are reopened, from changing the output state of module Z20 which is then at the "low" level. Accordingly, when latch RSL2 "sets", the analog comparator (acceleration) circuit ACA is deactivated.

Now when latch RSL2 "sets" its output "Q" is at a "high" level which is also imposed through conductor 27 on the upper input terminal of NOR module Z16. As its lower input terminal is then at a "low" level, the output of Z16 shifts from "high" to "low" level. As a result, the output of NOR module Z15 shifts from a "low" to the "high" level which in turn is imposed on the reset input terminal MR of counter 15. With a "high" level on the reset terminal of counter 15 the same is reset and held inactive to prevent any positive count signals at its count output terminals until such time as the contacts MC3 reopen. Of course, with counter 15 inactive, the outputs from comparator 17 will both be at "low" level thereby deactivating the effect of the digital timer DT and comparator DC on the NOR module Z14.

It will thus be seen that the setting of latch RSL2 effectively deactivates the analog comparator (acceleration) ACA and digital comparator DC when the initial motor starting current subsides to the desired normal running value.

ANALOG COMPARATOR (RUNNING)

The details of the ACR circuit are shown in FIGS. 2c and 2d. To comprise an operational amplifier Z6 which has its inverting input terminal connected to the output of amplifier Z4 through conductor 21 and a resistor R33. The non inverting input terminal of Z6 is connected to the slider of a rheostat RE3 which has one end of its resistance element connected in series with a resistor R39 to the grounded conductor 22, and the other end of its resistance element connected in series with resistors R37 and R38 to the +15 volt DC source. The point common between resistors R37 and R38 is connected to the cathode of a zener diode ZD2 which has its anode connected in series with a diode D15 to conductor 22 which establishes a desired reference potential at such common point.

By appropriate adjustment of the slider of rheostat RE3, the desired level of excess running current over rated value can be set to cause the desired operation of circuit ACR. With the output of amplifier Z4 at "low" level there will be a corresponding "low" level at the inverting input terminal of Z6 and consequently the latter will have a "high" level output at the moment contacts MC3 are closed.

The output terminal of Z6 is connected in series with a resistor R35 and a reversely poled diode D14 to the inverting input terminal of an operational amplifier Z7 which has its non inverting input terminal connected to the grounded conductor 22. A parallel combination of a resistor R30 and a capacitor C9 are connected between the output terminal of Z7 and its inverting input terminal. Thus, Z7 with the resistor R35 and capacitor C9 acts as a voltage integrator.

The output terminal of Z7 is connected to the inverting input terminal of an operational amplifier Z8 which has its non inverting input terminal connected in series with a resistor R40 to the +15 volt DC source. A zener diode ZD3 is connected between the grounded conductor 22 and the point common between resistor R40 and the non inverting input terminal of Z8 to establish a +DC bias determined by the voltage rating of ZD3. The output of Z8 is connected through a capacitor C10 to its inverting input terminal, and in series with a resistor R42 to the upper input terminal of NAND module Z20. Amplifier Z8 connected as hereinbefore shown and described functions as an inverting comparator switch.

Now when latch RSL2 "sets" the conductor 27 goes to a corresponding "high" level, thereby shutting off current flow through conductor 32 and diode D4. As a result, current then flows from the output of amplifier Z4 into the inverting terminal of amplifier Z6. When the potential applied on the latter terminal exceeds that on its non inverting input terminal the output of Z6 switches from a "high" to very "low" or "negative" level. The output of amplifier Z7 increases from its initial "low" state at a rate determined by the RC time constant of resistor R35 and capacitor C9. Consequently, the potential level on the inverting input terminal of amplifier Z8 follows that of the output of Z7. When the input level exceeds that applied on the non inverting input of Z8, the latter switches from a "high" to a "low" level thereby subjecting the upper input terminal of the NAND module Z20 to a "low" level. Z20 of course switches from a "low" to "high" level output thereby causing energization of the relay OLR as aforedescribed. The timed rate response of the integrator amplifier Z7 insures that circuit ACR will not respond to momentary transient surges in running current.

The operational amplifier Z3 acts as a reset-on stop switch. The inverting input terminal is connected through a resistor R12 to the output terminal of NAND module Z11, and also through a resistor R14 to −15 volts DC. The non inverting input terminal of Z3 is connected through a conductor 33 to ground. A feedback resistor R13 is connected between the output terminal of Z3 and its inverting input terminal.

It will be observed that with contacts MC3 open amplifier Z3 will have a "low" or "negative" output. When the contacts MC3 are closed the inverting input terminal of Z3 shifts from a "high" to a "low" potential resulting in the output of Z3 going to a "high" potential. Consequently, no current will flow through diode D12 or the conductor 34 while motor M is running.

Now when the contacts MC3 reopen, either in response to any of the overload conditions aforedescribed, or opening of "stop" switch 10, the output of NAND module Z11 shifts back from "low" to a "high" level thereby causing the output of amplifier Z3 to shift from a "high" to a "negative" level. Thus, current will then flow through the diode D12 and conductor 34 and also through conductor 32 and diode D3. This causes the comparator switches Z6 and Z9 to be reset back to their initial starting states wherein NAND module Z20 is set at a "low" level.

While the preferred embodiment of the invention has been described in connection with a three phase alternating current motor, it will be apparent to those skilled in the art that by suitable modification of the motor current sensing transformers and associated rectifier circuitry it can be readily adapted for use with other multiple and even single phase AC motos as well. Further, it will be apparent that the contacts OLR2 of overload relay can be used in various other control circuits to initiate deenergization of the main power supply contactors associated with such motors. It will also be apparent that by suitable modification for use of motor current sensing means appropriate for DC motors that the disclosed system can be used with the latter types of motors providing an AC supply source is available for operating the digital timing and comparing circuitry hereinbefore described.

We claim:

1. In an overload protection system for an electric motor which is connectable to an electric supply source by electroresponsive means, the combination with an electroresponsive relay which when energized causes said electroresponsive means to disconnect said motor from said supply source, of
    (a) means providing a control signal which varies in accordance with current drawn by said motor,
    (b) means responsive to connection of the motor to said supply source to provide a timed output signal upon elapse of a preset timed interval,
    (c) current overload responsive means activated by connection of said motor to said supply source to be responsive to a predetermined value of said control signal of said first mentioned means to provide an overload output signal,
    (d) second current overload responsive means responsive when activated to provide another overload output signal whenever said control signal of said first mentioned means exceeds another predetermined value,
    (e) means responsive to said motor attaining a predetermined running speed for deactivating said means providing said timed output signal and said first mentioned current overload responsive means, and for activating said second overload responsive means, and
    (f) means responsive alternatively to said timed output signal, or either of the first mentioned or said other overload control signals to energize said electroresponsive relay.

2. An overload protection system according to claim 1 for AC electric motors wherein the first mentioned means comprises current transformer means associated with the AC supply lines to the motor and means rectifying the output of said transformer means to provide a unidirectional control signal which varies in accordance with the current drawn by the motor.

3. An overload protection system according to claim 2 wherein said means providing a timed output signal comprises means providing count output pulses in relation to the AC power supply frequency, and means for counting and comparing the accumulated number of such pulses with a preselected number thereby to provide the timed output pulse where there is parity between such accumulated and preselected numbers of pulses.

4. An overload protection system according to claim 3 wherein the first mentioned current overload responsive means comprises amplifying means subjected to an adjustable reference potential representing a threshold level of overload current and to a potential proportional to said unidirectional control signal to effect energization of said electroresponsive relay.

5. An overload protection system according to claim 4 wherein said second current overload means comprises amplifying means which is subjected to an adjustable reference potential representing another threshold level of overload current and to a potential which is proportional to said unidirectional potential, and amplifier means which responds to a switched output of the last mentioned amplifying means to provide time delay energization of said electroresponsive relay to afford immunity against transient motor current surge response by such relay.

6. An overload protection system according to claim 5 wherein said means responsive alternatively to said timed output signal, or either said first mentioned or second overload control signals includes current amplifying means connected to the energizing winding of said electroresponsive relay.

7. An overload protection system according to claim 6 wherein said means responsive to said motor attaining a predetermined speed comprises latch means responsive to a "set" input signal to deactivate said means for counting and comparing count pulses and said first mentioned overload responsive means, and further comprises up-to-speed amplifying means which is subjected to a preselected reference potential representing said predetermined speed and to a potential proportional to said unidirectional control signal to "set" said latch means whenever the last mentioned potential exceeds its associated reference potential.

8. An overload protection system according to claim 7 together with means responsive to energization of said electroresponsive relay to "reset" said latch means and deactivate both of said current overload responsive means.

9. The combination with a polyphase alternating current motor, of
    (a) means including an electromagnetic contactor for connecting and disconnecting said motor from a source of polyphase AC supply,
    (b) an electromagnetic relay having normally closed contacts in circuit with the energizing coil of said contactor and having an operating coil which when energized effects deenergizaton of said contactor to disconnect said motor from the AC source of supply,
    (c) means including current transformers in the supply connections between said contactor and the motor primary terminals for providing a unidirectional control signal proportional to the current drawn by said motor,
    (d) means responsive to energization of said contactor to provide a timed output signal upon elapse of a preset timed interval,
    (e) current overload responsive means activated by energization of said contactor to be responsive to a predetermined value of said control signal to provide an overload output signal,
    (f) second current overload responsive means which when activated provides another overload output signal whenever said control signal exceeds another predetermined value,
    (g) means responsive to said motor attaining a predeterined running speed for deactivating said means providing said timed output signal and the first mentioned overload responsive means, and activating said second overload responsive means, and
    (h) means responsive alternatively to said timed output signal or to either of the first mentioned or said other overload output signals to effect energization of the operating coil of said relay.

10. The combination according to claim 9 wherein said first mentioned and said second current overload responsive means, are provided individually with adjustable means for setting the aforementioned predetermined values of said control signal to which they respectively respond, and wherein said means affording said timed output signal has means for selectively setting the elapsed time interval when said timed output signal occurs.

11. The combination according to claim 10 wherein said second current overload responsive means includes means affording time delay in the generation of its said overload output signal to afford immunity to transient motor current surges.

12. The combination according to claim 9 wherein the last recited means includes amplifying means responsive alternatively to said timed output signal, or either of said overload output signals to energize said relay.

13. The combination according to claim 9 wherein said means responsive to said motor attaining a predetermined speed comprises latch means responsive to a "set" input signal to deactivate said means providing said timed output signal and said first mentioned current overload responsive means, and activate said second current overload responsive means, and further comprises up-to-speed detector means including amplifying means which is subjected to a preselected reference potential representative of said predetermined speed and to a potential varying with said unidirectional control signal to "set" said latch means whenever the last specified potential exceed said reference potential.

14. The combination according to claim 13 together with means responsive to deenergization of said contactor to "reset" said latch means and deactivate both of said current overload responsive means.

* * * * *